(12) United States Patent
Kibol et al.

(10) Patent No.: US 8,042,362 B2
(45) Date of Patent: Oct. 25, 2011

(54) "KIBOL'S MODULE" PLANT FOR PRODUCING INORGANIC FIBERS OF ROCKS

(76) Inventors: Viktor F. Kibol, Kiev (UA); Roman V. Kibol, Kiev (UA)

( * ) Notice: Subject to any disclaimer, the term of this patent is extended or adjusted under 35 U.S.C. 154(b) by 203 days.

(21) Appl. No.: 12/067,262

(22) PCT Filed: Oct. 30, 2006

(86) PCT No.: PCT/UA2006/000059
§ 371 (c)(1),
(2), (4) Date: Mar. 18, 2008

(87) PCT Pub. No.: WO2008/054334
PCT Pub. Date: May 8, 2008

(65) Prior Publication Data
US 2010/0181202 A1    Jul. 22, 2010

(51) Int. Cl.
*C03B 5/00* (2006.01)
(52) U.S. Cl. .......... 65/347; 65/346; 65/134.1; 65/135.1; 65/135.2; 65/135.3; 65/135.8
(58) Field of Classification Search ................. 65/134.1, 65/135.1–135.3, 135.8, 346, 347, 471, 495
See application file for complete search history.

(56) References Cited

U.S. PATENT DOCUMENTS

| | | | | |
|---|---|---|---|---|
| 3,004,367 A * | 10/1961 | Webber et al. | .................. | 65/488 |
| 3,584,475 A * | 6/1971 | Galey et al. | ....................... | 65/24 |
| 4,557,743 A * | 12/1985 | Claes et al. | .................. | 65/29.12 |
| 5,573,569 A * | 11/1996 | Sorg et al. | .................... | 65/135.1 |
| 5,655,464 A * | 8/1997 | Moreau et al. | ................ | 110/335 |
| 6,125,660 A * | 10/2000 | Gorobinskaya et al. | ......... | 65/474 |
| 2005/0223752 A1 * | 10/2005 | Kibol | .............................. | 65/474 |

FOREIGN PATENT DOCUMENTS

| | | |
|---|---|---|
| EP | 1254868 | 6/2002 |
| JP | 11236237 | 8/1999 |
| RU | 2068814 | 11/1999 |
| RU | 2149841 | 5/2000 |
| RU | 2233810 | 8/2004 |

* cited by examiner

*Primary Examiner* — Queenie Dehghan
(74) *Attorney, Agent, or Firm* — DeLio & Peterson, LLC; Peter W. Peterson

(57) ABSTRACT

A plant for producing inorganic fibers from rocks includes a furnace for obtaining a melt connected to a feeder, working aperture and a warmed feeder with draw dies located below a working aperture. A transition chamber is installed on the feeder exit, the transition chamber intended for creation of a thin layer melt flow. An enclosure contains the working aperture. The transition chamber has a heater, a threshold installed at an entrance of the transition chamber and a plate rigidly fixed to an adjustable damper located over the threshold and adapted to move up and down together with the adjustable damper, with the plate surface being parallel to the bottom of the transition chamber. The plant is intended for obtaining the melt flow of a desired thickness and quality.

20 Claims, 2 Drawing Sheets

"KIBOL'S MODULE" PLANT FOR PRODUCING INORGANIC FIBERS OF ROCKS

BACKGROUND OF THE INVENTION

1. Field of the Invention

The proposed invention pertains to plants for producing inorganic fibers from melted rocks with narrow working interval and low diathermy, for example, basalts, diabases, amphibolites, andesites, dacites, rhyolites and other rocks.

The proposed invention provides most advantages in producing continuous inorganic fibers from highly heat-resistant melts with low diathermy, for example, basalts, diabases, amphibolites, andesites, dacites, rhyolites and other rocks. These fibers may be used for production of high-temperature woven and non-woven materials; textile, pierced, needle-punched, sewn-knitted fabrics used as heat and sound isolating and filtering materials; materials for composites and other products.

2. Description of Related Art

Industrial development and advancements put forward a number of new tasks, including further improvement of new materials production technologies, these new material possessing such qualities as high thermal resistance, non-toxicity, biological neutrality. Products manufactured of such materials are needed for machine building, metallurgy, chemical, radio-electronic industry, instrument engineering and construction materials production. There materials and products made of them are urgently needed for nuclear power sector, oil and gas extraction: this pertains primarily to thermal insulation of industrial facilities and equipment, maintenance personnel, high-temperature filtering, oil and air separation, lubricant and water separation; oil and water separation. These requirements are met to a considerable extent by products made of basalt and other fibers. Currently, their only drawback is a high cost. It is possible to decrease the cost of such fibers by way of increasing the output, i.e. using new machines, technologies providing higher productivity. It may be possible to enhance the quality of fibers produced by way of improving the melts processing, because it would allow to produce fibers of smaller diameter, which are more flexible, strong and chemically resistant. Improvement of melt processing may be attained through improved surface melting of lump material, thermal and relaxational homogenization of a melt.

Reduction of diameter of continuous fibers produced of melts of thermoplastic materials with narrow working interval may be possible by way of increasing the working zone, decreasing the time of forming the cones from thoroughly pre-homogenized melt.

The state of the art suggests straight flow glass furnace comprising the melting tray, transversal recesses in the bottom for glass formation and homogenization, respectively, electrodes, bubble nozzles, refining zone, equalizing basin and flow channel (USSR Author's Certificate No. 881009, class C 03B 5/04, 1980).

The drawback of such furnace is its unsuitability for producing melt from rocks because due to bad diathermy of rocks melt efficient transfer of heat for the melting occurs in a layer 50 to 100 mm thick, while (as it well known) straight flow furnace has much bigger depth of melting zone basin.

The state of the art also teaches a glass furnace containing melting, thin layer refining and working basins interconnected with a flow channel, gas burners and the gas space divided by the shield (USSR Author's Certificate No. 659634, class C 03B 5/04, 1979).

The drawback of such furnace structure is that along with decrease of furnace dimensions the path of glass melt flow is made longer due to labyrinth partitions in order to allow enough time to perform melting and refining of glass mass in the labyrinth through waist sections. This increases the contact area of flow with refractory material and in the process of operation inevitably causes glass mass pollution with refractory material destruction products. Such pollution increases with increase of total length of melt contact zone with refractory material. Besides, use of lateral burners does not provide uniform heating in the whole zone because of various temperature characteristics of the torch structure and impedes the exit of gas bubbles due to relatively higher pressure in gas space of each of the sections formed by vertical transverse partitions.

The device for manufacturing fibres from rocks, which contains the melting furnace, working zone and draw die is known. Crushed rocks are fed by a charging device to melting furnace where they are melted. Melt is transferred from the furnace through a feeder to the working zone. Then, the fiber is formed using draw dies. In such plant the ratio of melting zone area to working zone area is usually 0.45 to 0.55. Such plant enables to produce continuous fiber from mineral raw material. However, due to specifics of chemical composition of rocks and low heat conductivity of their melts, use of melting zone to working zone area ratios known for glass fiber manufacturing leads to situation where in continuous process of fibers production the melt does not have enough time for homogenization and arrives to working zone with considerable content of crystalline phase. It disrupts the process of fibers formation in draw die tank, increase fibers breakages, and, hence, decreases the plant productivity and does not allow to obtain high quality fibers.

The state of the art also suggests the plant for producing inorganic fibers, comprising melting furnace bath, feeder, fiber formation assembly comprising flow and draw die feeders, reeling mechanism with spool and lubricant of produced thread ("Building materials and constructions" journal, No. 3, 1986, p. 11-12). The furnace is heated by natural gas by means of gas-air burners which are installed in such a manner that they warm primarily the melting furnace bath where basalt rocks are melt. Homogenization occurs in the feeder by way of melt dwelling. The temperature there is below working temperature although it is maintained above the crystallization upper limit (1200° C.). As a result, homogenization process has poor quality, melt stratification occurs, not melted fractions are deposited at the bottom of the feeder, for example, quartz pieces contained in rocks. After a while such deposits affect stability of continuous fiber manufacturing unit operation. Also, it is well known that basalt belongs to "super short" glasses class having very narrow working temperature interval of 20-60° C., while such interval for other compositions is 5 times more. Therefore, it is very important to maintain constant temperature in fiber formation zone without local excessive heating, which is not ensured by the known plant. For the above reasons the known plant does not allow to obtain fibers less than 11 μm in diameter which are used in production of, for example, fine filters.

The plant for producing inorganic fibers from rocks, comprising the furnace for obtaining the melt connected with feeder, working aperture connected with a feeder, and warmed draw die feeder located below the working aperture (the patent of the Russian Federation No. 02118300, IPC 4 C 03B 37/02, 1998) is the closest to the proposed invention in terms of technological essence and the achieved result. The proposed plant also comprises dispenser for basalt feeding, heat exchanger connected with combustion space of the melting furnace. The melting furnace has stabilizing section in which melted glass mass is stabilized by volume to temperature of fiber output. The melting furnace and stabilizing section have heating systems. The stabilizing section of the melting furnace is connected to a feeder where melt is stabilized until weight averaging and ensuring the needed relationship of components in a composition. The feeder has drain units and the feeders feeding melt to the draw dies through which the thread of continuous basalt fiber is drawn. Then the thread is transferred to lubricant applying unit and reeled on spools.

The heat exchanger in dispenser of the proposed plant provides uniform heating through all volume of basalt with hot air flow from combustion space of the melting furnace which allows to use waste gases and reduce fuel consumption. Melt glass mass stabilizing section with the height equal to 0.4 . . . 0.6 of melting furnace basin height promotes melt stabilization by volume at the exit of the furnace with the set temperature. The stabilizing section height is defined by melt height during temperature decrease and also possibility of gases and foam discharge.

The drawback of the above plant is insufficient strength of fibers produced at this plant. The reason is, primarily, temperature and composition inhomogeneity of the melt fed to draw die unit. Usually, the melt contains such compounds as albite, anorthite, olivine, augite. The mentioned compounds have essentially different temperatures of phase transitions, therefore process of rock melting may be considered as transformation in the heterogeneous system with elements having mutual effect on each other, in particular, in terms of their mutual wetting. Therefore the produced melt contains inclusions in the form of not melted fragments or even lumps. Relatively heavy inclusions are usually located in the lower part of melt flow, while relatively light inclusions are in the upper part of the flow. Presence of such inclusions reduces the tensile breaking strength of produced fibers and also leads to instability of the process of producing continuous fibers and accelerates the wear of draw die feeder.

SUMMARY OF THE INVENTION

The proposed plant provides melt flow homogeneous in terms of temperature and composition in the working aperture zone. It is attained by means of adjustable damper installed at the entrance of the transition chamber, which does allow upper part of the flow (i.e. foam) to pass to the working aperture, and by means of the threshold installed below the adjustable damper, which does not allow unmelted rock particles to pass to the transition chamber. This significantly reduces the possibility of formation of stress concentrators in produced fiber and also the draw dies clogging.

The bottom of the transition chamber is inclined towards the working aperture that ensures necessary stable pressure of the melt in the working aperture zone. Slope angle and length of the transition chamber are selected by way of experiments. The above parameters depend on melt viscosity and temperature and also on the necessary diameter of the draw dies. Usually the slope angle of the transition chamber is 8 . . . 65° relative to the horizontal plane and length of transition chamber equals to 1.0 . . . 1.9 m.

In the process of creation of the invention the authors have experimentally found the optimum relationship of geometrical sizes of the furnace, accumulator tank and transition chamber in the plant for producing fibers from rocks. Found optimum relationships of geometrical sizes create conditions for obtaining practically completely homogenized rock melt. The ratio of furnace basin area to transition chamber area is 9.0 . . . 50.0. Under optimum energy consumption and optimum melt temperature this relationship provides stability of temperature range and viscosity necessary for producing continuous fiber with stable characteristics. Both increase and decrease of the specified parameters results in drastic decrease of the quality of fibers produced, in particular, causes decrease in stability of their drawing.

Homogenized melt arrival to fiber production zone enables increase in the plant productivity, because such melt does not essentially contain crystalline inclusions, which significantly reduces breakage of a fiber during its drawing.

It is known that rocks are characterized in that during their formation from melted magma, there are no separate oxides of minerals remained, but rather their compounds are created, for example, albite $NaAlSi_3O_8$, aporthite $CaAl_2Si_3O_8$, dioxide $Ca(MgFeSi_2O_6)$, olivine $(MgFe)_2SiO_4$, augite $Ca(MgFe)(Si_2O_6)$ etc. During melting these compounds move from one phase to another separately, in the process of obtaining homogenized melt. Therefore process of rock melt may be considered as heterogeneous system consisting of several different bodies (crystal, glass). It means that in case if the ratio of tank area to working zone is less than 9.7, during continuous process of fibers producing it would be possible that crystalline inclusions come from melting zone to the working zone causing disruptions in fibers formation by draw dies and breaking the fibers. If this ratio is over 48.4, then due to big difference in the surface areas of the mentioned tanks the melt will inevitably have temperature inhomogeneity by layers, which would cause worsening of mechanical properties of the fibers produced and also would lead to higher specific energy consumption with lower furnace productivity, because in case of such ratio the area of heated tank is increased relative to the area of the transition chamber. However, plant productivity is defined by the area of the transition chamber with working unit, i.e. with the same output the volume of loaded rocks increases, and consequently, specific energy inputs increase in order to receive melt in the furnace tank. Such energy inputs are unjustified as they do not lead to increase in productivity and do not influence quality of the melt arriving to the transition chamber and draw die feeder, and consequently, quality of produced fiber. Besides, this will not allow obtaining sufficiently homogenized melt, which leads to worsening of the fibers produced.

The accumulator tank is equipped with the stirrer with the electric drive; such stirrer is intended for mixing the melt and preventing its stratification. The threshold is located at the exit of the accumulator tank; such threshold does not let unmelted particles and elements of furnace refractory materials destruction to pass into feeder.

The transition chamber is located between the feeder and working aperture with draw die feeder below level of the feeder, accumulator tank and the furnace. The threshold is located on the bottom of the transition chamber; the restrictive adjustable damper (bar) is located over the threshold. They allow only central part of the melt to flow into draw die feeder, while retarding unmelted heavy and light particles. The height of each threshold is 10 . . . 100 mm. For the purpose of increasing the speed of delivery of the prepared melt to the working aperture and adjusting the melt temperature the transition chamber is supplemented with burners with their torches directed towards the inclined surface of the transition chamber bottom. Also the authors have found the optimum relationship between the length of the transition chamber and the width of the feeder to maintain temperature uniformity of the melt. Such ratio equals to 2.0:1 to 5.5:1. In order to maintain stable temperature of the melt, draw die feeder is installed at the distance T from the feeder axis $T=(0.95 . . . 5.0) H$, where H is the feeder width. The structure of the plant, its transition chamber do not allow to install the draw die feeder at the distance less than 0.95H from the feeder exit. Installation of the draw die feeder at the distance over 5.0H makes longer the way of melt passage to the draw dies for obtaining the fibers and leads to inevitable loss of melt temperature uniformity and also to increase of the fuel (gas) supply rate to the burners. The chosen dimensions and ratios of the plant in terms of lengths of basins and chambers enable production of fibers from rocks with high efficiency, even, for example, in case of using eight hundred to six thousand and more draw die feeders. The proposed plant for producing the fibers from the wide spectrum of rocks allows to produce high-strength, corrosion-resistant, heat-resistant continuous fiber from rocks with different composition and to simplify the technology of its production.

In order to decrease heat losses and increase the plant productivity, the dimensions of the heat stressed elements of the plant are decreased and the plant comprises two working apertures and their axes may be perpendicular or may be not perpendicular to the feeder axis. Also, in order to decrease heat losses, increase the plant efficiency and create stable adiabatic conditions for melt preparation, the plant elements contacting the melt are lined with heat resistant and current conducting materials. Also electrical heating elements are installed in upper part of the feeder in its central channel. Installation is equipped with pipes for discharging unmelted particles and elements of refractory materials destruction, which are installed in the accumulator tank and in the end of the feeder.

The raw materials used are the crushed rocks. It has various inclusions including those with meting temperature exceeding 1400° C. If such inclusions enter the working aperture zone, they periodically clog the draw dies and, thus, prevent obtaining the fibers several microns thick. Such inclusions effect on the final product may be seen not only during the fiber drawing but also after the fiber production. Therefore its is very important to remove these inclusions before producing the continuous fiber. In case of heating to the temperature 1600° C. these inclusions can remain in the melt composition. However, our experiments show that these inclusions are destroyed after attaining the melt temperature of 2000° C. and above. The proposed plant allows creating conditions for decreasing the strength of crystal lattice of the crushed rock—raw material—by way of its heating to the temperature 2000° C. and above. At these temperatures it is possible to remove harmful impurities form the raw material as these impurities have higher melting temperatures, clog draw dies used for fibers formation. Besides, in order to solve the above problem, the electric heating based on ionic conductance of the liquid melt is used in the accumulator tank. Metal rods having diameter of 25 . . . 55 mm are installed at the height of 40 . . . 90 mm from the tank bottom. These rods project 40 . . . 70 mm from the wall. Electric current is input to such rods and flow through the melt between electrodes. Electric heating creates rather uniform melt temperature in the whole cross-section of the accumulator tank. Change of the current amperage allows to control melt temperature easily and quickly, which is very important for use of the proposed module for producing fibers from various rocks. During repair the metal rods are extended to obtain necessary length and burnt rods are replaced with new ones. The tank design allows to conduct continuous transfer of the degassed and homogenized melt to the feeder using the stirrer which continuously vertically moves in the melt. Low heat conductivity of the melt and its lack of diathermancy do not allow to achieve uniform temperature in the whole volume of the liquid matter, especially with the layer thickness over 100 mm. Usually, the upper layers have higher temperature than the lower layers, therefore use of the stirrer is necessary.

Significant problem for stable process of continuous fiber production is the presence of iron oxide FeO in the melt, which significantly changes the process of mineral formation. $Fe^{2+}$ cations possessing higher activation energy than $Ca^{2+}$ and $Mg^{2+}$ cations actively form compounds with silicon-oxygen anions, substituting Ca and even Mg in pyroxenes and forming ferruginous pyroxenes of diopside-hedenbergite and augite type. Such substitutions usually lead to creation of significant internal stresses in a fiber and to formation of microcracks on its surface, which essentially reduces strength of a fiber. In order to decrease FeO content in the melt, it is bubbled by the warmed air, which causes two-valence iron to transform into three-valence state according to the formula $4FeO+O_2=2Fe_2O_3$. The balance is shifted towards $Fe_2O_3$, which allows to reduce melt viscosity, for example at working temperature of 1250° C. from 439 poise to 319 poise. At the same time the temperature of crystallization upper limit is decreased by 26 . . . 32° C., which allows to conduct stabler drawing of a fiber.

As the metal oxides in the rock melts are in a dissociation condition, electric current flow through the melt can cause their precipitation using the unit for removing iron containing impurities from the melt, such unit being a source of direct or unidirectional current with hollow electrodes installed at the feeder entrance and connected to corresponding poles of the current source. If the electrode is installed, for example, in mounted in a depression at the feeder entrance, where the reducer is supplied through the bubbling tube, such reducing agent being, for example, natural gas mixed with air entrance the ratio 1:10 or lower, part of the natural gas is not burned completely, thus carbon monoxide CO is formed. This gas reacts with iron oxides having a liquid form within the melt according to the reaction:

$$Fe_2O_3+CO=2FeO+CO_2$$

$$FeO+CO=Fe+CO_2$$

Carbon dioxide formed together with combustion products is discharged outside, while reduced iron concentrates in the lower part of the depression in the feeder bottom and then discharged outside via the channel inside the hollow electrode. Due such iron reduction the melt is continuously depleted of iron oxides.

As a result, the melt depleted in iron oxides and enriched in $SiO_2$ oxides is transferred over the threshold to the feeder. Due to the fact that the melt does not contain usual percentage of iron oxides the fiber working zone becomes wider and fibers quality improves, i.e. they become more heat resistant, elastic, and strong.

Rock is melt in the furnace at the temperature above 1500° C. in oxidative medium thus the extent of melt amorphism increases, i.e. there is a transition from crystalline to glass state.

Rock melting is performed in oxidative medium in gas heated furnace.

Air excess coefficient ($\beta$) is the relation between actual air quantity present in the combustible mixture to theoretically necessary for complete burning.

In order to define the oxygen content in percents, the chemical analysis of air and gas mixture is performed. Under stoichiometric relationship of gas and air, the oxygen content in air and gas mixture is defined according to the following formula:

$$O_2 = \frac{A * V_0}{V_0 + 1}(\%),$$

where

A(%)—oxygen content in the ambient air, $V_0(nm^3)$—theoretically necessary quantity of air (stoichiometric volume) for gas burning.

Stoichiometric volume of air for burning 1 kg of solid or liquid fuel is calculated according to the following formula:

$$V_0 = 0.0889 \cdot [C] + 0.265 \cdot [H] - 0.03337 \cdot ([H] - [S]),$$

where $V_0(m^3/kg)$—stoichiometric volume of air,

[C], [H], [S]—carbon, hydrogen, oxygen and sulphur content in fuel (reference data).

In case of lack of data about the fuel content $V_0$ it is possible to define, assuming that 0.27 cubic meters of air is theoretically necessary for each 1 mJ of specific combustion heat of fuel.

Stoichiometric volume of air for burning of 1 cubic meter of gaseous fuel is calculated according to the formula:

$$V_0 = 0.0476 \cdot (0.5 \cdot [CO] + 0.5 \cdot [H_2] + 1.5 \cdot [H_2S] + S \cdot (m+n/4) \cdot [C_mH_n] - [O_2]),$$

where $V_0(m^3/m^3)$—stoichiometric volume of air, $[O_2]$, $[H_2]$, $[CO]$, $[H_2S]$, $[C_mH_n]$—content of oxygen, hydrogen, carbon monoxide, hydrogen sulphide and the gas consisting from m carbon atoms and n hydrogen atoms in fuel;

In the absence of data about unsaturated hydrocarbon content, it is assumed that they consist of $[C_2H_4]$.

Actual volume of air for burning is defined experimentally using anemometer and a stop watch.

Excess air coefficient for burning is calculated according to the formula:

$$\beta = \frac{V_0}{V_f},$$

where

β—excess air coefficient, $V_0$, $(m^3/kg)$, $(m^3/m^3)$—stoichiometric volume of air for burning, $V_f$, $(m^3/kg)$, $(m^3/m^3)$—actual volume of air for burning.

In the process of operating the plant using the gas, a lot of attention is given to combustion process control. Disruption of this process leads to appearing of incomplete burning products or excess of air in flue gases. The analysis of composition of smoke gases gives the possibility to define completeness of combustion, excess of air, nature of gas medium. The samples of smoke gases are collected in various zones using gas analyzer, the content of $[CO_2]$, $[O_2]$, $[CO]$ and other products of combustion is defined.

Based on the results of a gas analysis the excess air coefficient is defined according to the formula:

$$\beta = \frac{21}{21 - O_{excess}},$$

$$O_{excess} = [O_2] - 0.5 \cdot [CO] - 0.5 \cdot [H_2] - 2 \cdot [CH_4]$$

where $[O_2]$, $[CO]$, $[H_2]$, $[CH_4]$—concentration of the corresponding gases in % (vol.), according to the results of combustion products gas analysis.

The table 1 contains the data of smoke gases composition. Based on this analysis, completeness of combustion, excess of air, nature of gas medium were determined.

TABLE 1

|   | β | $[O_2]$ | $[CO_2]$ | $[CO]$ |
|---|---|---|---|---|
| 1 | 1.11 | 2.5 | 10.6 | 0.8 |
| 2 | 1.18 | 3.7 | 1.6 | 0.5 |
| 3 | 1.25 | 4.8 | 10.4 | 0.2 |
| 4 | 1.28 | 5.2 | 11.3 | 0 |

Increase of air excess coefficient drastically reduces a thermal flow to glass mass, which causes crystals formation that do not allow to draw fibers, and decrease of this coefficient causes incomplete combustion of fuel, which is determined by gas analyzer based on appearing of significant amount of CO in smoke gases. These quantities will reduce bivalent iron which raises the temperature of crystallization upper limit and thus complicates the process of fibers drawing.

It was found through experiments that in order to melt base class of rocks, air excess coefficient should be within the limits β=1.11 . . . 1.28, at the same time $Fe_2O_3$ content in fiber increases and attain the ratio of $FeO/Fe_2O_3 \geq 0.4$. Such ratio of iron oxides allows to reduce loss of strength in the conditions of operation at high temperatures when fiber material crystallization occurs. It may be explained as follows: first microcrystalline hematite is formed and then pyroxenes are crystallized around it. Under the ratio $FeO/Fe_2O_3 \geq 0.4$ the first phase formed is large-crystalline magnetite (at lower temperatures than hematite), and then pyroxenes. The residual strength of fibers at hematite crystallization is higher, especially at high temperatures.

Analysis of the experimental data shows, that decrease of tensile strength of fibers with the ratio $FeO/Fe_2O_3 \geq 0.4$ equals approximately 20% at the temperature 600° C.

Thus, process conducting in the proposed mode (temperature in the furnace 1600° C., in accumulator tank 2000 . . . 2200° C. in oxidative medium) allows to maintain and increase initial strength of fibers. Maintenance of optimum ratio $FeO/Fe_2O_3 \geq 0.4$ allows to raise the temperature of using more than by 120° C.

The specified parameters of conducting the process of continuous fiber manufacturing are defined as a result of experimental research of wide spectrum of rocks from base to acidic, characterized by a various chemical composition and texture-structural features.

Rocks are charged into the furnace, where they are melted. Then melt flows through the flow channels first to the accumulator tank and then to the feeder where there melt is transferred also to the transition chamber for supplying to draw dies.

In the accumulator tank, feeder melt is overheated in the zone of contact with heat transfer, hence, its viscosity is lower. Viscosity gradually increases in the depth of the melt, and its temperature decreases. Excessive heating of the upper part of the melt causes variation of the formed fibers diameter which increases breakages. Collection of the melt located below certain level leads to creation of crystallization centres in the fibers and decreasing of their strength characteristics. In order to receive the melt with constant temperature through all depth in the working zone of the transition chamber additional heating of melt is performed.

Melt heating in the transition chamber is performed using gas burners installed in the upper part of the transition chamber. The flame from gas burners is directed to the adjustable damper and movable plate rigidly fixed to it which is parallel to the bottom of the transition chamber. They serve as shields that reduce the effect of natural gas components on the melt. Thus, the melt is exposed to intensive final finishing in the melt thin layer. These shields are made of materials with the melt temperature exceeding 1300° C., for example, from a heat-resistant alloy, silicon carbide, zirconium oxide etc.

Simultaneously with melt heating the adjustable damper is moved in the melt depth in order to obtain the melt with constant viscosity and thickness.

allows to decrease the stabilization time in the feeder, fulfill mass averaging and ensure the above relationships of components.

These relationships provide stability of the temperature and viscosity range necessary for fiber production.

Examples of four types of volcanic rocks compositions are given below. Belonging to a group is defined based on silicon dioxide content in rocks: Basalt—48 . . . 53%; Andesite—54 . . . 62%; Dacite—63 . . . 70%; Rhyolite—70 . . . 76%, physical, mechanical and chemical properties of fibers are presented in the table 2. Data sources are Russian invention patents Nos. 2120423, 2233810.

TABLE 2

| Oxides, weight %; average ratios; properties | Basalt/ Patent RU 2,120,423 | Andesite/ Patent RU 2,120,423 | Dacite/ Patent RU 2,233,810 | Rhyolite/ Patent RU 2,233,810 |
|---|---|---|---|---|
| 1 | 2 | 3 | 4 | 5 |
| $SiO_2$ | 47.9 | 53.8 | 64.1 | 73.5 |
| $Al_2O_3$ | 14.9 | 17.5 | 16.6 | 11.9 |
| $Fe_2O_3$ | 2.9 | 3.4 | 2.1 | 2.0 |
| FeO | 8.4 | 5.6 | 3.1 | 1.5 |
| MgO | 8.9 | 4.5 | 1.9 | 0.3 |
| CaO | 10.2 | 7.7 | 5.4 | 0.7 |
| $Na_2O$ | 2.5 | 3.9 | 4.1 | 4.4 |
| $K_2O$ | 0.7 | 1.2 | 1.3 | 4.9 |
| $H_2O$ | 0.8 | 1.0 | 0.5 | 0.4 |
| $TiO_2$ | 2.2 | 1.2 | 0.7 | 0.2 |
| $P_2O_5$ | 0.4 | 1.1 | 0.5 | 0.1 |
| MnO | 0.2 | 0.1 | 0.1 | 0.1 |
| $\dfrac{FeO}{Fe2O3}$ | 2.90 | 1.65 | 1.48 | 0.75 |
| $\dfrac{Al2O3 + SiO2}{CaO + MgO}$ | 3.29 | 5.84 | 11.05 | — |
| $\dfrac{2Al2O3 + SiO2}{2Fe2O3 + FeO + CaO + MgO + K2O + Na2O}$ | 2.13 | 2.99 | 4.87 | 6.16 |
| Diameter of an elementary fiber (in μm) | 4.0 . . . 5.5 | 3.9 . . . 13 | 5.6 . . . 12.4 | 4.7 . . . 12.5 |
| Tensile strength (in MPa) | 2000 | 2280 | 2490 | 3115 |
| Fiber chemical strength in % after 3 hours of boiling in 2N HCl | 77.5 | 90.8 | 92 | 95.2 |

Thus, this method of fibers productions allows to increase the rock melt collection limit though height of the melt from rocks by way of maintaining constant viscosity and temperature through all its depth, which decreases fibers breakage and therefore increases their quality and stability of production process.

The technical problem is solved by way of heating the melt in the accumulator tank until obtaining the following ratio of its main components $$\frac{FeO}{Fe_2O_3} \geq 0.4$$

$$\frac{Al_2O_3 + SiO_2}{CaO + MgO} \geq 2.5$$

after that it is stabilized in the feeder at the temperature, at least, 100° C. above its working temperature interval. Thus, the volume of glass mass is stabilized, its surface becomes flat and smooth and the melt temperature evenly decreases in the whole volume until the temperature of fiber production. This As may be seen from table 2, the proposed "Kibol's Module" allows to receive very strong, corrosion resistant, heat resistant continuous fiber from various kinds of rocks.

Such construction of the plant for fibers production from rocks ensures necessary quality of the melt prepared from a material with a narrow working temperature interval, which practically does not exceed 30° C. and requires especially accurate following technological specifics of production: ensuring uniform chemical composition of the melt, maintaining constant (within 1 . . . 1.5%) viscosity, excluding notable relaxation phenomena in melt, which can lead to formation of zone currents and to change of viscosity and temperatures in melt layers, to formation of the currents in the melt differing in both chemical composition and temperature.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
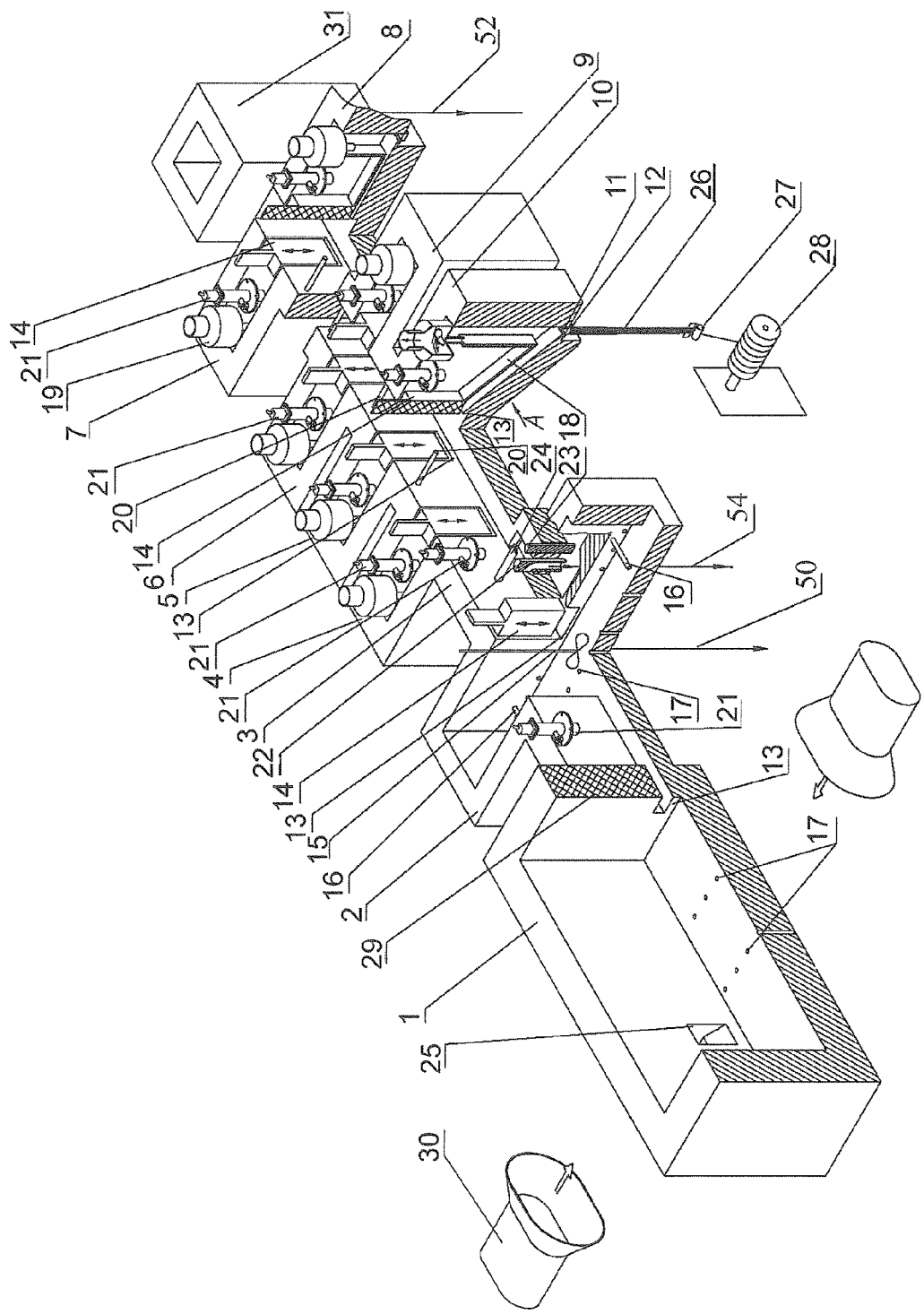
FIG. 1 schematically illustrates the proposed plant for producing inorganic fibers from rocks, namely "Kibol's Module".
Figure 2:
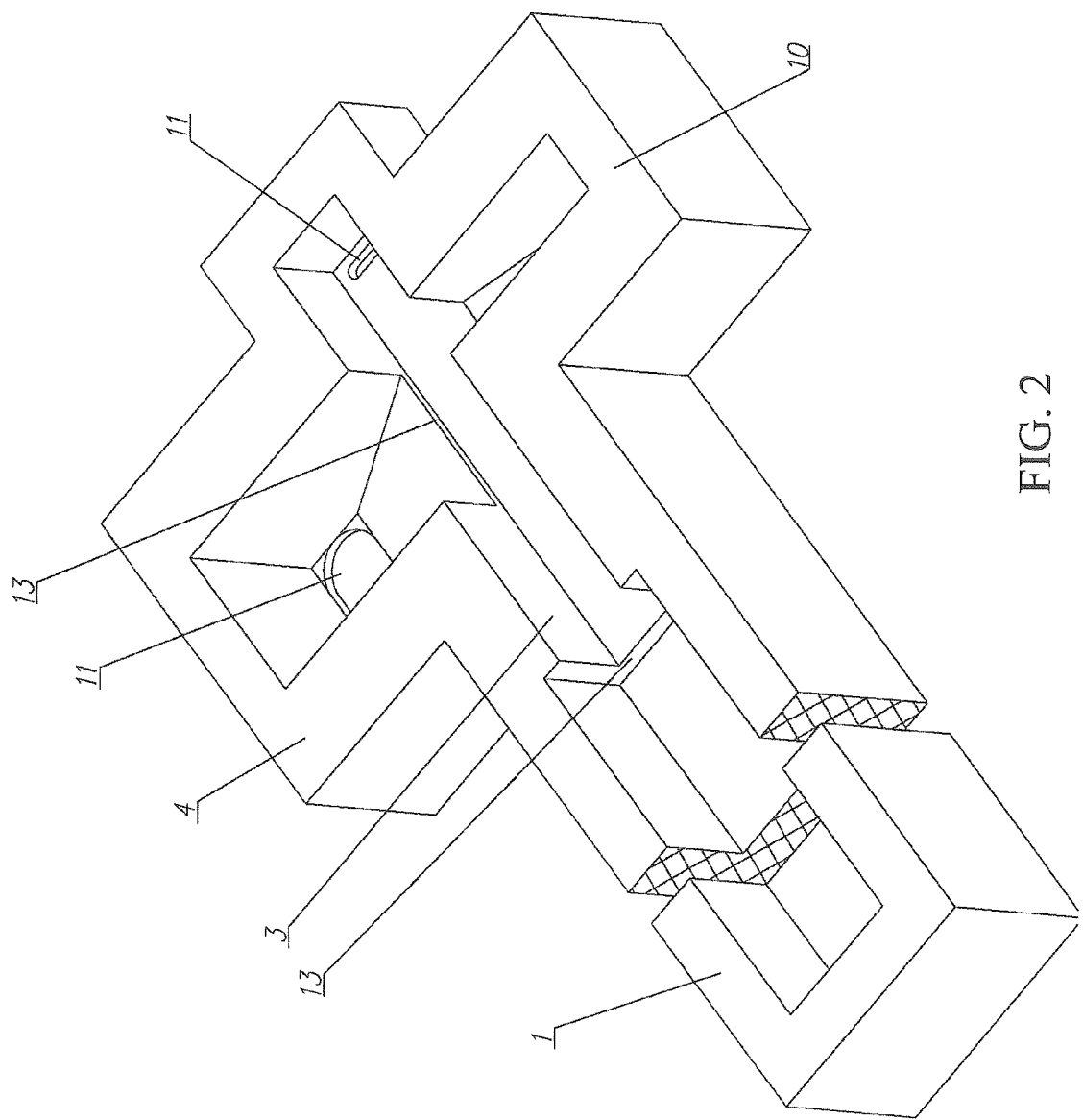
FIG. 2 schematically illustrates transition chambers with different volumes and inclination angles of transition chambers bottoms.

In describing the preferred embodiment of the present invention, reference will be made herein to FIGS. 1-2 of the drawings in which like numerals refer to like features of the invention.

"Kibol's Module" plant for producing inorganic fibers of rocks comprises furnace for producing the melt 1. The exit of the furnace 1 is connected with the entrance of the accumulation tank 2. The exit of the accumulation tank 2 is connected with the feeder 3. The plant has eight transition chambers 4, 5, 6, 7, 8, 9, 10 (the eighth transition chamber is not shown). The feeder 3 has a corresponding exit to each of transition chambers 4, 5, 6, 7, 8, 9, 10. Each transition chamber 4, 5, 6, 7, 8, 9, 10 has own working aperture 11 and warmed feeder with draw dies 12 located below the working aperture 11. Each transition chamber 4, 5, 6, 7, 8, 9, 10 is intended for creating thin layer melt flow. Each transition chamber 4, 5, 6, 7, 8, 9, 10 is equipped with the heater. The bottom of transition chambers 7, 8 is made horizontal. It is not inclined. The bottom of chambers 4, 5, 6, 9, 10 is inclined towards working aperture 11. The angle of inclination for each of the chambers 4, 5, 6, 9, 10 is selected experimentally for producing specific type of fiber and products.

Table 3 contains experimental data of the angle of inclination (α) and some types of the products.

TABLE 3

| Number of draw dies | Transition chamber bottom inclination angle α exp. (in degrees) | Types of products |
| --- | --- | --- |
| 200 | 8 . . . 23 | 1. Cord thread |
|  |  | 2. Andesite thread |
| 800 | 19 . . . 35 | Roving RB 13-800-76 |
| 2000 | 35 . . . 65 | Chopped basalt fiber BS 13-6r-76 |

The angle of inclination (α) for producing specific type of fibers, for example rovings for producing basalt-plastic pipes is α=19 . . . 35, in case of chopped fibers for canvases α=35 . . . 65, for threads with different linear density for producing fabrics for printed circuits from rocks α=8 . . . 25. The above materials and products can be produced at one proposed plant simultaneously. Transition chambers 4, 5, 6, 7, 8, 9, 10 have different volumes that allows to obtain necessary quantity (volume) of fibers from each chamber, i.e. up to 1 thousand tons of a fiber per year, and operate them independently. Entrance of each transition chamber 4, 5, 6, 7, 8, 9, 10 comprises the threshold 13 and adjustable damper 14 above the threshold 13. They serve to obtain the melt flow of necessary thickness and quality. Each adjustable damper 14 has the form of a guillotine with horizontal working edge which can completely block the melt flow to the corresponding transition chamber 4, 5, 6, 7, 8, 9, 10, if necessary. Each adjustable damper 14 is installed in such a way that in case of closing the entrance to each transition chamber 4, 5, 6, 7, 8, 9, 10 its lateral flat surface can touch the lateral surface of the threshold 13. The accumulator tank 2 is installed between the exit of the furnace 1 for producing the melt and the feeder 3 and is intended for obtaining the melt homogeneous in terms of composition and temperature. Distance T from draw die feeder axis 12 to the feeder axis 3 is T=4.5H for transition chambers 4, 5, 6, T=2.3H for the transition chamber 7, T=1.44H for the transition chamber 8, T=3.65H for transition chambers 9, 10. The plant comprises eight transition chambers 4, 5, 6, 7, 8, 9, 10 and, accordingly, eight working apertures, which axes lay on the plane perpendicular to the feeder axis 3. Axes of the working apertures can lay in the planes which are not perpendicular to feeder axis 3. It is defined by technological requirements of the production. Thus, in order to decrease the length of the feeder 3 transition chambers are located symmetrically to the feeder 3 axis, i.e. four transition chambers on each side: 4, 5, 6, 7 on one side and 8, 9, 10 (plus the eighth) on the other side. The accumulator tank 2 is equipped with the stirrer 15 intended for mixing the melt and heating system with electrodes 16 intended for heating the melt by way of passing electric current through it. The adjustable damper 14 is installed immediately before the entrance of each transition chamber 4, 5, 6, 7, 8, 9, 10 with possibility of regulating of the height of its location relative to the threshold of the corresponding transition chamber. The ratio of the furnace 1 basin to transition chambers 4, 5, 6, 7, 8, 9, 10 areas is usually 48.4 for transition chambers 4, 5, 6, 11.2 for the transition chamber 7, 9.68 for the transition chamber 8, 20.2 for transition chambers 9, 10.

Data of calculation of the furnace basin and transition chambers areas are presented in table 4.

TABLE 4

| | | | |
| --- | --- | --- | --- |
| The area of the furnace basin $S_{furnace\ basin}$ (in m$^2$) | 6.0 | 12.5 | 30.0 |
| Transition chamber area $S_{transition\ chamber}$ (in m$^2$) | 0.62 | 0.62 | 0.62 |
| $S_{furnace\ basin}/S_{transition\ chamber}$ ratio | 9.68 | 20.16 | 48.39 |
| Furnace capacity (in t/day) | 5.76 | 11.52 | 28.8 |
| One unit productivity (in kg/hour) | 120 | 120 | 120 |

The plant is equipped with units for bottom and lateral bubbling 17. Each transition chamber 4, 5, 6, 7, 8, 9, 10 is supplied with the movable plate 18 rigidly fixed to the adjustable damper 14, and the surface of the plate 18 is parallel to the bottom of the corresponding transition chamber.

Each transition chamber 4, 5, 6, 7, 8, 9, 10 is equipped with the drawing unit 19 in its upper part, such unit is connected with the drawing tube (not shown). The ratio of each transition chamber 4, 5, 6, 7, 8, 9, 10 length to the feeder 3 width is 5.5 for transition chambers 4, 5, 6, 2.5 for the transition chamber 7, 2.0 for the transition chamber 8, 3.6 for transition chambers 9, 10. These size ratios from 2.0:1 to 5.5:1 is due to the fact that the length of the transition chamber working aperture is equal to the length of the draw die feeder, and the feeder channel width should be sufficient to provide quality melt to all feeders. There are optimum limits of the channel width which are defined by the fact that under smaller width melt hydraulic slope increases, hydrostatic head of draw die feeders becomes unequal, and also inhomogeneity of melt by depth near first (by flow) draw die feeders increases; under bigger width the speed of melt flow decreases and temperature and viscosity inhomogeneity by the channel width is observed. Beyond the above limits melt inhomogeneity increased and draw die feeders operation became impossible due to non-uniform flow of the melt from draw dies.

The feeder 3 and accumulator tank 2 has through holes made therein and supplied with discharge valves intended for discharging of not melted particles and refractory materials destruction elements (not shown). Bottoms of the accumulator tank 2 and the feeder 3 are lined with heat resistant and electric current conducting materials made of heat-resistant alloy of silicon carbide. Electric heating elements 20 on the form of resistance furnaces are installed in the central upper part of the feeder 3.

Each transition chamber 4, 5, 6, 7, 8, 9, 10 contains air-gas burner 21 adapted to aim the flame to the plate 18 surface and to the adjustable damper 14 surface.

The ratio of working aperture 11 area to the total area of apertures of draw dies feeder is 7.0 . . . 20.5 for different transition chambers, and the area of each draw die aperture equals to 1.3-8.5 mm2.

These relationships provide optimum conditions for cones formation. The fibers are then formed from such cones. It is known, that the volume of cones is influenced by diameter of the draw die, draw die plate temperature and a glass mass pressure in the vessel. With a view to the fact that rocks have narrow working temperature interval, melt temperature and temperature of electric current heated plate are actually equal, viscosity of melt in working aperture 11 is equal to melt viscosity on the draw die plate 12, and also due to low diathermancy of rocks melt, thickness of its layer with uniform characteristics in melting tank, feeder 3 and each transition chamber (4, 5, 6, 7, 8, 9, 10) and over draw die plate 12 does not exceed 10 . . . 30 mm, therefore it is possible to assume that the ratio of melt flow through working aperture 11 to the total flow through draw die plate 12 is equal to the ration of the working aperture area 11 to the total area of apertures of the draw die plate 12 (see table 5).

TABLE 5

| | | | |
|---|---|---|---|
| The area of the working aperture $S_{aperture}$ (in mm$^2$), | 21670 | 41800 | 36000 |
| Quantity of draw dies in the feeder (pcs) | 800 | 1200 | 2000 |
| Diameter of the draw die (in mm) | 1.3 | 1.82 | 1.82 |
| The draw die area (in mm$^2$) | 1.327 | 2.600 | 2.600 |
| Total area of draw dies $S_{total}$ (in mm$^2$) | 1061.36 | 3120.24 | 5200.40 |
| $S_{aperture}/S_{total}$ ratio | 20.4 | 13.3 | 6.92 |

This ratio was 7.0 to 20.5. In case if this ratio exceeds the upper limit of 20.5, excess of melt starts to arrive to draw dies, thus the cones are not formed and stability of production process is disrupted. If the ratio is below the lower limit of 7.0, the working aperture does not provide the draw dies with sufficient quantity of melt which is necessary for stable formation of a cone and the stable flow of a stream from a draw die. As a result, the melt supply for processing is interrupted, diameter is changed and drop of a fiber breaks off, productivity of the plant decreases.

During experiments specific melt flow through one draw die was found to be 0.8 to 1.2 g/min. According to the above principles pertaining to fibers formation mechanism, a cone volume and melt flow through a draw die is defined by the latter's area which is 1.3 to 8.5 mm$^2$. If the draw die area is less than 1.3 mm$^2$, cone formation is impeded, its volume is insufficient for stable production of fiber that leads to increased specific breakages in fibers. If such area exceeds the upper limit, there is a transition from the process of cone formation to the process of melt stream formation. It increases diameter of a primary fiber, reduces its tensile strength and leads to increased breakages. Thus, by selecting the above relationships of technological parameters of fibers production from rocks melts it is possible to decrease significantly the fibers breakages, which means higher technological stability and productivity of the process of fibers productions from rocks melts.

The is equipped with the unit for removing iron containing impurities from the melt, such unit is installed in the flow channel of the feeder 3, between accumulator tank 2 and the first row of transition chambers. This unit is a source of direct or pulsing current (not shown) with electrodes 22, 23 installed at the entrance of the feeder 3 and connected to corresponding poles of the current source. One of the electrodes, electrode 22, is connected to the negative pole of the current source and has the form of the hollow tube with its upper edge installed in recess in the bottom of the feeder 3. The electrode 22 is intended for concentrating reduced iron around it and discharging such iron through the electrode 22 cavity outside. As metal oxides in the rock melts are in a dissociation condition, electric current flow through the melt can cause their precipitation near electrode 22 mounted in the recess in the bottom of the feeder 3, where reducing agent (gas of the series: natural gas, carbon monoxide, hydrogen etc.) is supplied through the bubbling tube 24. Reaction in said zone in feeder 3 bottom recess results in iron reduction. Due to such iron reduction the melt is continuously depleted of iron oxides and becomes richer in oxides $SiO_2$.

The proposed plant comprises tank melting furnace with direct heating 1 having a feeder and working aperture. Such furnaces are more economic, have high productivity, can be easily mechanized and automated. Thus, it is possible to maintain stable temperature by tank length there with constant composition of gases over the melt. For smoke gases discharge the furnace 1 is equipped with recuperator (not shown). The furnace 1 walls comprise inspection holes, holes for installing thermocouples, melt level sensors, gas burners (not shown), and also a pocket for loading the raw materials 25. Below the working apertures 11 there are draw die feeders 12 intended for a drawing fibers 26 through them. In order to lubricate the fibers 26, the plant comprises reservoir (not shown) with lubricant which is supplied to lubricating unit 27. Unused lubricant is collected to reservoir with the pump (not shown) for pumping lubricant from one reservoir to another (not shown). The plant comprises the system of mechanisms (not shown) for supplying one part of fibers after lubrication to reeling apparatus 28 where they are wound on the spool (not shown). For processing another part of the fibers coming out of draw die feeder 12 the plant is equipped with chopping machine (not shown), which is installed at another level, different from level of the reeling apparatus 28 installation. The furnace 1 for melting crushed rocks contains a tank made of refractory material with a pocket for loading the rocks 25. The furnace 1 bottom comprises holes with bubbling nozzles 17 intended for intensive mixing of melt in order to increase its uniformity in terms of chemical composition. The bottom of the furnace 1 comprises the threshold 13 arresting heavy unmelted particles. Protecting bar 29 is installed over the threshold at the exit of the furnace 1, such protecting bar keeps away mud and foam. The furnace 1 is supplied by means for its heating using natural gas by means of gas-air burners (not shown). The plant comprises accumulator tank 2 for melt averaging in tenns of temperature and chemical composition. Accumulator tank 2 has the stirrer 15 installed therein and also bubbling system including bottom and lateral nozzles 17. Besides, the accumulator tank 2 is equipped with electrodes 16 intended for heating the melt by passing electric current through it. The accumulator tank 2 is connected to a feeder 3 through the threshold 13 with adjustable damper 14 installed over it.

Electric heating elements 20 and air gas burners 21 are installed in the central channel of the feeder 3. The feeder is connected with all transition chambers through the threshold 13.

The threshold 13 is installed at the bottom of the transition chamber and adjustable damper 14 with regulating (mobile) plate 18 rigidly connected thereto is located over the threshold. The adjustable damper 14 is installed immediately before the entrance of the feeder 3 and all transition chambers 4, 5, 6, 7, 8, 9, 10 with possibility of regulating of the height of its location relative to the feeder 3 bottom and transition chambers. The threshold 13 is installed at the entrance of all transition chambers 4, 5, 6, 7, 8, 9, 10, and air-gas burner 21 and the exhaust unit 19 are installed above. Draw die feeders 12 including 200 to 6000 draw dies each are installed under working aperture 11 of each transition chamber. The bottom of transition chambers 4, 5, 6, 9 and 10 has an inclination towards draw die feeders 12, and the angles of bottom inclination are different on the different sides of the feeder 3. Air-gas burners 21 intended for heating the melt are installed over the bottom of all transition chambers. Ratio of transition chambers length (P) to the feeder width (F) is P/F=(2.0 ... 5.5):1. Draw die feeders 12 are installed at the distance T from the feeder 3 axis T=3.5H, where H is the feeder width. Feeder 3 and accumulator tank 2 have pipes for discharging unmelted particles and refractory materials destruction elements. The furnace 1 is air cooled by means of the blowers 30 intended for creation of constant skull layer of solidified melt on the walls of the furnace 1 tank, which preserves thermal characteristics of the furnace 1 and improve working conditions for the personnel.

The proposed plant operates in the following manner. Preliminary, raw materials, i.e. crushed rocks, are loaded to the furnace 1 up to ⅓ of the tank height and ram firmly. Then the furnace is ignited and rocks are fed to the furnace through inclined loading pocket 25. While moving through the inclined pocket 25, rocks start to be melted using, in such a way, radiant energy of the whole volume of the tank.

Smoke gases generated in the melt process are discharged through a recuperator. Melting process is performed with intensive stirring of the melt in order to increase its uniformity in terms of chemical composition. Besides, in case of producing the melt with low diathermancy, not melted pieces of material getting to the bottom of the furnace 1 would stay solid and unmelted for a long time, which would result not only in reduction of productivity but also in necessity of repairs to remove unmelted material. Using of bubbling processing of the melt by nozzles 17 with narrow temperature interval allows to ensure uniformity of melt, both in terms of viscosity and chemical composition in the volume of melting tank. The furnace 1 is heated by natural gas by means of gas-air burners (not shown). In the process of rocks melting the level of melt surface rises above the threshold 13 and arrives to the accumulator tank 2 for averaging of temperature and chemical composition of the melt. At this time the stirrer 15 is put into operation and warmed air is supplied through bubbling nozzles 17. In the accumulator tank 2 the melt is exposed to thermal effect of electric current passed through electrodes 16. Thus, slight excessive heating of the melt is attained relative to melt temperature in the furnace. Through the threshold 13 and the adjustable damper 14 the melt arrives to the feeder 3 where the iron trapping unit is installed, where reducing agent is supplied through bubbling tube 24 in recess in the bottom of the feeder 3. Carbon dioxide formed as a result of incomplete burning of the natural gas together with combustion products are discharged outside through smoke pipe 31, while reduced iron concentrates in the recess in the feeder 3 bottom where it is heated by electric current until liquid flowing state and then discharged outside from the feeder 3 via the cavity in electrode 22. The concentrated reduced iron discharge is shown by directional arrow 54. Directional arrows 50,52 indicate the flow of the melt discharge. The feeder 3 is warmed from above by burning gas arriving from air-gas burners 21 and electric heating elements 20 which maintain the melt temperature in the feeder 3 as accurately as ±0.5° C.

Use of electric heaters 20 allows to improve working conditions for the plant operator. Protecting bar 29 in the furnace 1 promotes removal of gas bubbles and foam. From the furnace 1 the melt arrives to the accumulator tank 2 where it is exposed to heating by direct passing of electric current using electrodes 16, to intensive mixing by the stirrer 15 and bubbling through nozzles 17. The melt processed is such a way comes from the accumulator tank 2 through the threshold 13, adjustable damper 14 to the feeder 3. Iron is removed from the melt through cavity of the electrode 22 of iron removal unit in the feeder 3. Further, through the threshold 13 and adjustable damper 14 at the exit of the feeder 3 to each transition chamber, the melt is directed to working through working apertures 11 to draw die feeders 12. Thanks to heating of the transition chamber, the melt homogenization attained earlier is maintained, which allows to produce fibers of high quality and necessary diameter. The warmed up melt arrives to draw die feeders 12 from which the fibers 26 are drawn. Fibers 26 are lubricated by lubricant supplied from reservoir by lubricating unit 27. Unused lubricant is gathered to reservoirs and then pumped back to lubricating unit 27. After lubrication one part of fibers 26 is supplied through the system of mechanisms to reeling up apparatus 28 where they are wound on the spool. Another part of the fibers 26 coming out of draw die feeders are supplied to chopping machine which is installed at another level different from the level of the reeling unit installation.

The use of the proposed plant for producing fibers from rocks allows to provide stable fibers production from melts of basalts, amphibolites, diabases, andesites, dacites, rhyolites and other rocks. Produced fibers favorably differ from known glass fibers as they have better heat resistance, chemical resistance in acid medium and better strength characteristics. However, the main thing is that under deficit of raw materials and refractory materials for glass fibers production, inorganic fibers production becomes a valuable solution. There are a lot of open mines for rocks extraction, the cost of raw materials is incomparably lower than the cost of glass charge.

Products from basalt fibers can be used for heat and sound insulation of various facilities; heat shielding of servicing personnel; filtering of liquids, gases with simultaneous adsorption of harmful substances; meeting the needs of chemical, petrochemical and biochemical industries; in radio electronics; motor industry; shipbuilding; cement industry; in coal extraction, for manufacturing of mine supports; for replacement of cancerogenic asbestos products; and in many other industries.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A plant for producing inorganic fibers from rocks, comprising a furnace for obtaining a melt connected to a feeder, and a transition chamber installed on the feeder exit; the transition chamber intended for creation of a thin layer melt flow, and is an enclosure containing a working aperture, and a warmed feeder with draw dies located below the working aperture; the transition chamber further comprising a heater, a threshold installed at an entrance of the transition chamber, and a plate rigidly fixed to an adjustable damper located over the threshold and being adapted to move up and down together with the adjustable damper; the plate surface being parallel to the bottom of the transition chamber, wherein the plant is intended for obtaining the melt flow of a desired thickness and quality.

2. The plant according to claim 1, wherein the bottom of the transition chamber has an inclination directed towards the working aperture.

3. The plant according to claim 2 wherein the plant has a unit for removing iron containing impurities from the melt, the unit being the source of direct or pulsing current and having electrodes installed at a feeder entrance, connected to corresponding poles of the current source and intended for passing electric current through the melt.

4. The plant according to claim 1, wherein the plant has an accumulator tank installed between the exit of the furnace for obtaining the melt and the feeder, the accumulator tank intended for receiving the melt homogeneous in terms of composition and temperature.

5. The plant according to claim 4, wherein the accumulator tank has a stirrer for mixing the melt and a system of heating with electrodes for melt heating by way of direct passing of an electric current therethrough.

6. The plant according to claim 4, wherein the feeder and accumulator tank have through holes formed therein and are supplied with discharge valves for discharging unmelted particles and elements of refractory materials destruction.

7. The plant according to claim 4, wherein the bottom of the accumulator tank and the feeder are lined with high-melting and current-conducting materials.

8. The plant according to claim 7, wherein the high-melting and current-conducting materials are silicon carbide or zirconium oxide.

9. The plant according to claim 1 wherein the feeder has a feeder width and a feeder axis in the direction of melt transfer through the furnace, and wherein the transition chamber includes a draw die feeder, feeder axis and a feeder axis, and wherein a distance T from the draw die feeder to the feeder axis ranges from T=0.95 H to T=5.0 H, where H is the feeder width.

10. The plant according to claim 1, wherein the plant comprises two transition chambers and, accordingly, two working apertures.

11. The plant according to claim 10, wherein the transition chambers have different volumes and different angles of bottom inclination towards corresponding working aperture.

12. The plant according to claim 1, wherein the adjustable damper is installed immediately before the entry to the transition chamber for adjusting the transition chamber entrance height relative to the transition chamber threshold.

13. The plant according to claim 1, wherein the area of the furnace basin is between about 9.7 and 48.4 times of the area of the transition chamber.

14. The plant according to claim 1, wherein the plant has the means for performing bottom and lateral bubbling.

15. The plant according to claim 1, wherein the transition chamber is equipped with a drawing unit in its upper part, such unit is connected with a drawing tube.

16. The plant according to claim 1, wherein the ratio of transition chamber length to the feeder width is between about 2.0:1 and 5.5:1.

17. The plant according to claim 1, including electric heating elements installed in a central upper part of the feeder.

18. The plant according to claim 1, wherein the transition chamber heater is formed as at least one gas burner adapted to direct a flame to the surface of the plate, and to the surface of the adjustable damper.

19. The plant according to claim 1, wherein the ratio of working aperture area to total area of the feeder draw dies is between about 7.0 and 20.5, and wherein each draw die has an opening, with the area of the opening equal to between about 1.3 and 8.5 mm$^2$.

20. The plant according to claim 1 wherein the plant has a unit for removing iron containing impurities from the melt, the unit being the source of direct or pulsing current and having electrodes installed at a feeder entrance, connected to corresponding poles of the current source and intended for passing electric current through the melt.

* * * * *